Patented Dec. 12, 1922.

1,438,587

UNITED STATES PATENT OFFICE.

WILLIAM FELDENHEIMER, OF LONDON, ENGLAND.

TREATMENT OF CLAY AND PRODUCT THEREOF.

No Drawing.     Application filed October 12, 1920. Serial No. 416,528.

*To all whom it may concern:*

Be it known that I, WILLIAM FELDENHEIMER, a subject of the King of England, residing at London, England, have invented certain new and useful Improvements in the Treatment of Clay and Product Thereof, of which the following is a specification.

This invention is for improvements in and relating to the treatment of clay.

It is known to purify clay by suspending it in a liquid medium by aid of an alkaline deflocculator and after subsidence of the impurities to separate the clay substance from the liquid by addition of a suitable precipiant. The proposal has further been made to purify clay and kaolin, and to obtain a product containing a reduced quantity of water, by fractional settlement of the material from the sol condition, whereby water is expressed from the clay fraction. A comination of a settling process with electrical action has also been proposed for the treatment of clay in the sol state in water.

It has now been found that if clay, preferably a purified clay, be dispersed or suspended and the dispersion or suspension be treated as hereinafter set forth, the clay acquires useful properties, for example, its addition to a rubber mixing results in an acceleration of the cure, and an improved dispensibility of the final product.

According to the present invention, the improved process for the treatment of clay, preferably a purified clay, comprising suspending the clay in water by aid of a deflocculator, for example, sodium carbonate, and evaporating the clay suspension to dryness.

In certain cases the clay may advantageously be submitted to preliminary purification, and in one preferred mode of operation according to this invention a clay, for example, a high class china clay, which has been prepared in accordance with one of the processes set forth in the specification of British Letters Patent No. 106,890 or U. S. Patent No. 1,324,958, is employed.

The clay may be first mixed with sufficient water to give a pasty mass, and then the required quantity of deflocculator added to produce the desired fluidity, with or without further addition of deflocculator until the fluidity at first produced decreases. Alternatively, the clay may be directly worked up with water and the deflocculator in due proportion to bring about the desired degree of fluidity in one operation.

In carrying the invention into effect in one way, the clay is first cleaned and dried in the manner described in the specification of British Letters Patent No. 106,890 or U. S. Patent No. 1,324,958. One may proceed for example as follows:—

A normally settling clay, such as Fraddon china clay, mined from Fraddon Down, Cornwall, is first washed by a known process consisting in passing the clay over mica-drags in the usual manner, but, instead of using water only, a solution of 1.2 parts by weight of sodium carbonate (free from water of crystallization) in 2000 parts by weight of water is employed for 100 parts, or 5 per cent by weight of clay, in other words a 5 per cent, suspension. This carbonate solution causes a greater quantity of "mica" to be deposited on the drags than in the case when water alone is employed, and the solution, with the clay dispersed in it, is then passed on to a settling tank where it is left long enough, say four hours, for further deposition of the "mica". From this tank, the solution carrying the clay is run into a depositing tank where a weak solution of commercial alum is added in quantity sufficient approximately to neutralize the alkalinity of the solution and to deposit the clay as is commonly done in such cases.

If desired, the deflocculator, that is the sodium carbonate, may be added to the suspension while it is in the tank and not while the suspension is running over the mica-drags, and after being left to stand in the tank for about four hours, a period insufficient to allow a deposition of clay to occur, the suspension may be run into a second tank where the flocculator, that is, the solution of alum, is added, and such flocculating reagent is added sufficiently slowly, or in such total quantity relatively to the quantity of the deflocculator, as to cause flocculation or coagulation of the clay, but not rapid sedimentation.

The process so far described is only a means of obtaining a purified clay, and that part of the process to which the present invention relates consists according to this example in deflocculating the clay so procured by thoroughly mixing the latter with an equal weight of water in the presence of 3 per cent anhydrous sodium carbonate by weight relatively to the weight of the water. The water is then evaporated without the addition of any other reagent and the clay so obtained is the product required.

Instead of sodium carbonate, other deflocculators may be employed, such for example, as ammonia.

The amount of deflocculator to be used can be gauged if desired by mixing the clay with sufficient water to give a mixture of a pasty consistency, and then adding just sufficient deflocculating agent to produce fluidity. In actual practice, of course, the amount of deflocculator necessary can be ascertained in a sample, and then the whole of the deflocculator which it to be used can be added in one operation with the water when making the suspension.

For some purposes it will be found advantageous to increase the proportion of deflocculator until the fluidity of the mixture commences to decrease.

For example, if the clay is to be used for incorporation with rubber it has been found that if with Fraddon clay, prepared according to the aforesaid specifications in the name of W. Feldenheimer, say 0.25 to 1 per cent of sodium carbonate, for instance, the ordinary quality known as soda ash, be employed relatively to the weight of water (distilled), the clay so treated when dried and added to a rubber mixing will accelerate the cure of the rubber and slightly increase the distensibility. If, on the other hand, a 3 per cent to a 5 per cent concentration be employed so that the clay is just commencing to return to the pasty state, the rate of cure of the rubber with which the dried clay is mixed is still further increased and the distensibility also much augmented.

Obviously, the less water used in preparing the clay, the less there is subsequently to evaporate, and it will be found that if enough water be added to bring the clay into a pasty condition, this will usually be sufficient for carrying out the process, and represents approximately the minimum quantity of water which can be used.

As already indicated, clay has heretofore been prepared by making a suspension of it in water with a deflocculator and then throwing it down by aid of a reagent, running off the liquid and drying the flocculated material. It has been found, however, that particular qualities are possessed by clay which has been dried in the deflocculated state which are not obtainable when the drying is effected after flocculation as the immediately preceding operation.

What I claim as my invention and desire to secure by Letters Patent is:—

1. The process for the treatment of clay which consists in suspending the clay in water by the aid of a deflocculator and evaporating the clay suspension containing substantially all the deflocculator employed to substantial dryness.

2. The process for the treatment of clay which consists in first purifying the clay then suspending the purified clay in water by the aid of a deflocculator and evaporating the clay suspension containing substantially all the deflocculator employed to substantial dryness.

3. The process for the treatment of clay which consists in purifying the clay by a deflocculation process, suspending the purified clay in water by the aid of a deflocculator and evaporating the clay suspension to substantial dryness.

4. The process for the treatment of clay consisting in mixing the clay with sufficient water to produce a paste, adding a deflocculator to the requisite amount to produce fluidity, and then evaporating the clay suspension containing substantially all the deflocculator employed, to substantial dryness.

5. The process for the treatment of clay which consists in purifying the clay by a deflocculation process, adding a flocculator, suspending the flocculated clay in water by the aid of a deflocculator and then evaporating the suspension to substantial dryness.

6. The process for the treatment of clay consisting in suspending the clay in water by the aid of an alkaline deflocculating reagent, and then evaporating the suspension to substantial dryness.

7. A dried clay containing a deflocculating agent in quantity to deflocculate the clay if mingled with sufficient water to form a fluid paste, the deflocculating agent being in intimate contact with the individual particles of clay.

8. A dried clay containing an alkaline deflocculating agent in quantity sufficient to deflocculate the clay if mingled with sufficient water to form a fluid paste, the deflocculating agent being in intimate contact with the individual particles of clay.

9. In the process of treating clay, the step consisting in drying the same while in suspension in the presence of a deflocculating agent.

In testimony whereof I affix my signature.

WILLIAM FELDENHEIMER.